United States Patent
Dreps et al.

(10) Patent No.: US 6,470,458 B1
(45) Date of Patent: Oct. 22, 2002

(54) METHOD AND SYSTEM FOR DATA PROCESSING SYSTEM SELF-SYNCHRONIZATION

(75) Inventors: Daniel Mark Dreps, Georgetown, TX (US); Frank David Ferraiolo, Essex, VT (US); Daniel John Kolor, Wappingers Falls, NY (US); Bradley McCredie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,951

(22) Filed: Jul. 29, 1999

(51) Int. Cl.[7] .................................................. G06F 1/12
(52) U.S. Cl. ........................... 713/400; 713/1; 713/500; 713/600
(58) Field of Search ........................... 713/1, 400, 500, 713/600

(56) References Cited

U.S. PATENT DOCUMENTS

| | | | | |
|---|---|---|---|---|
| 4,843,263 A | * | 6/1989 | Ando | 327/297 |
| 5,963,609 A | * | 10/1999 | Huang | 375/377 |
| 6,021,504 A | * | 2/2000 | Yamasaki | 713/400 |

* cited by examiner

*Primary Examiner*—Jeffrey Gaffin
*Assistant Examiner*—Tammara Peyton
(74) *Attorney, Agent, or Firm*—Anthony V. S. England; Bracewell & Patterson, L.L.P.

(57) ABSTRACT

A method and system for dynamic synchronization of a data processing system processor chips. One of a plurality of chips is designated as a primary chip and all other chips as secondary chips. The clock phase of the chips are synchronized utilizing the primary chip's clock phase as a reference clock phase for the secondary chips.

20 Claims, 17 Drawing Sheets

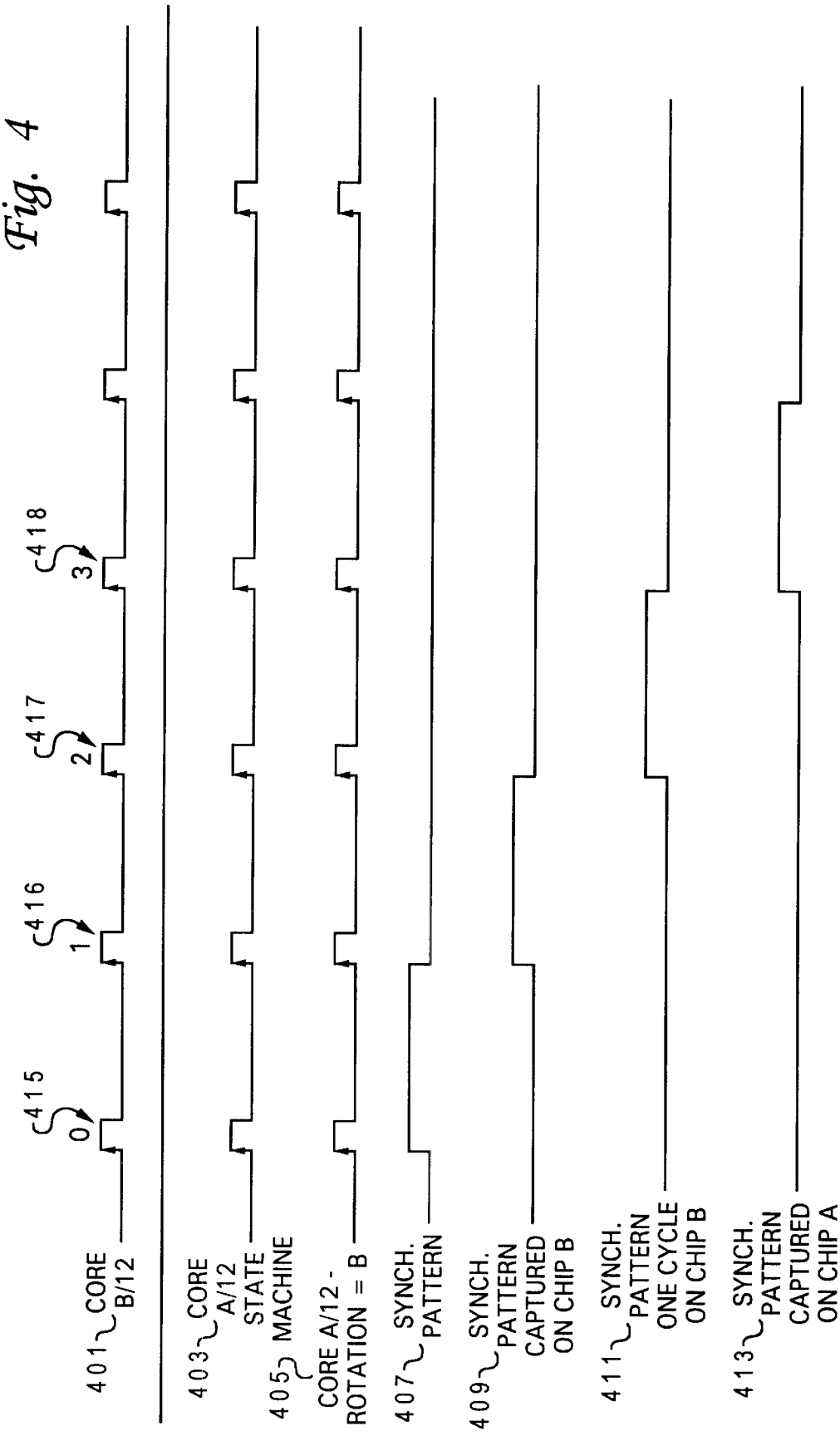

CAPTURE 3 BUS CYCLES FROM
LAUNCH WITH ROTATION CLOCK

METHOD AND SYSTEM FOR DATA PROCESSING SYSTEM SELF-SYNCHRONIZATION

CROSS-REFERENCE TO RELATED PATENT APPLICATIONS

The present invention is related to the subject matter of co-pending United States Patent Application entitled "Programmable Delay Element," filed Mar. 5, 1999, Ser. No. 09/263,671 assigned to the assignee herein named. The contents of the above-mentioned co-pending patent application is incorporated by reference herein.

BACKGROUND OF THE INVENTION

1. Technical Field

The present invention relates to data processing systems, and in particular to a method and system for improved synchronization of a data processing system's components. Still more particularly, the present invention relates to a method and system for dynamic self-synchronization of data processing system components.

2. Description of the Prior Art

Synchronization among chip components of a data processing system is an important aspect of system performance. When chips are synchronized, they are able to execute similarly. However, if chips are not synchronized, then the same instruction takes place on different chips at different times. In present day data processing, it is desired to have systems which are deterministic, particularly for utilization with logical functions and flow which require orderly flow. Presently, most synchronization is handled via phase locked loop circuitry.

Phase-locked loop ("PLL") circuits are electronic circuits utilized for locking an output signal in phase and frequency with a reference signal. In recent years, PLL circuits have often been employed in data processing systems and microprocessors for the purpose of generating a local clock signal that is phase-aligned with a reference clock signal generated by a crystal or another PLL circuit.

Typically, both the low-pass filter and the voltage control oscillator (VCO) of a PLL circuit employ analog components, and because of these analog components, PLL circuits are notoriously sensitive to environmental influences. In addition, there are also other sources that affect the performance of a PLL circuit, for example, a noisy or missing input reference signal, a noisy or missing output signal, a noisy or insufficient power supply to the PLL circuits, or extraneous noise picked up by the PLL circuit. Quite often, any one or more of the above factors may lead the PLL circuit output signal to lose lock with the input reference signal.

Another method of synchronizing clocks is by utilizing high speed clocks to synchronize the low speed clocks of the chips. With high speed clocks distributed to multiple chips within a system it is difficult to guarantee synchronization. Chips processes may become chaotic. Chips are to be run as fast as possible while keeping the clock frequencies high (within the chips). When data is transferred, a divided down clock is utilized between the chips. Traditionally, a divide-by-N circuit is utilized for the purpose of chip-to-chip communication. N represents an integer selected by the system developer. Divide-by-N circuits may yield one of N states. For example, a divide-by-four yields four different possibilities/states. Each state can be arbitrary and is affected by the way the individual chip is initialized and started. When chips are interconnected, one chip is unaware what the other chips are doing, resulting in potentially different states running simultaneously.

Data transmission systems or data processing systems generally demand a very high level of determinism. Due to the speed of the systems, a dynamic synchronization method is required to ensure this determinism is achieved. Presently, it is difficult to provide a method or system which provides this level of synchronization without a PLL.

It is therefore desirable to have a method and system for providing system synchronization. It is further desirable to have such a system and method wherein a system is synchronized dynamically by utilizing its internal components and clock circuitry to synchronize one chip with another.

SUMMARY OF THE INVENTION

In view of the foregoing, it is therefore one object of the present invention to provide an improved data processing system.

It is another object of the present invention to provide an improved method and system for improved synchronization of a data processing system's components.

It is yet another object of the present invention to provide a method and system for dynamic self-synchronization of data processing system components.

The foregoing objects are achieved as is now described. A method and system for dynamic synchronization of a data processing system processor chips is disclosed. One of a plurality of chips is designated as a primary chip and all other chips as secondary chips. The clock phase of the chips are synchronized utilizing the primary chip's clock phase as a reference clock phase for the secondary chips.

In one embodiment, a synchronization pattern is transmitted from the secondary chip to the primary chip. The pattern is received by the primary chip and retransmitted to the secondary chip. A state machine of the secondary chip logs the number of clock cycles required for the pattern to complete the round trip and compares the number of clock cycles to a predetermined value. The local clock of the secondary chip is adjusted based on the result of this comparison.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a timing diagram of a self-synchronization cycle according to one embodiment of the present invention;

DETAILED DESCRIPTION OF A PREFERRED EMBODIMENT

Figure 1A:
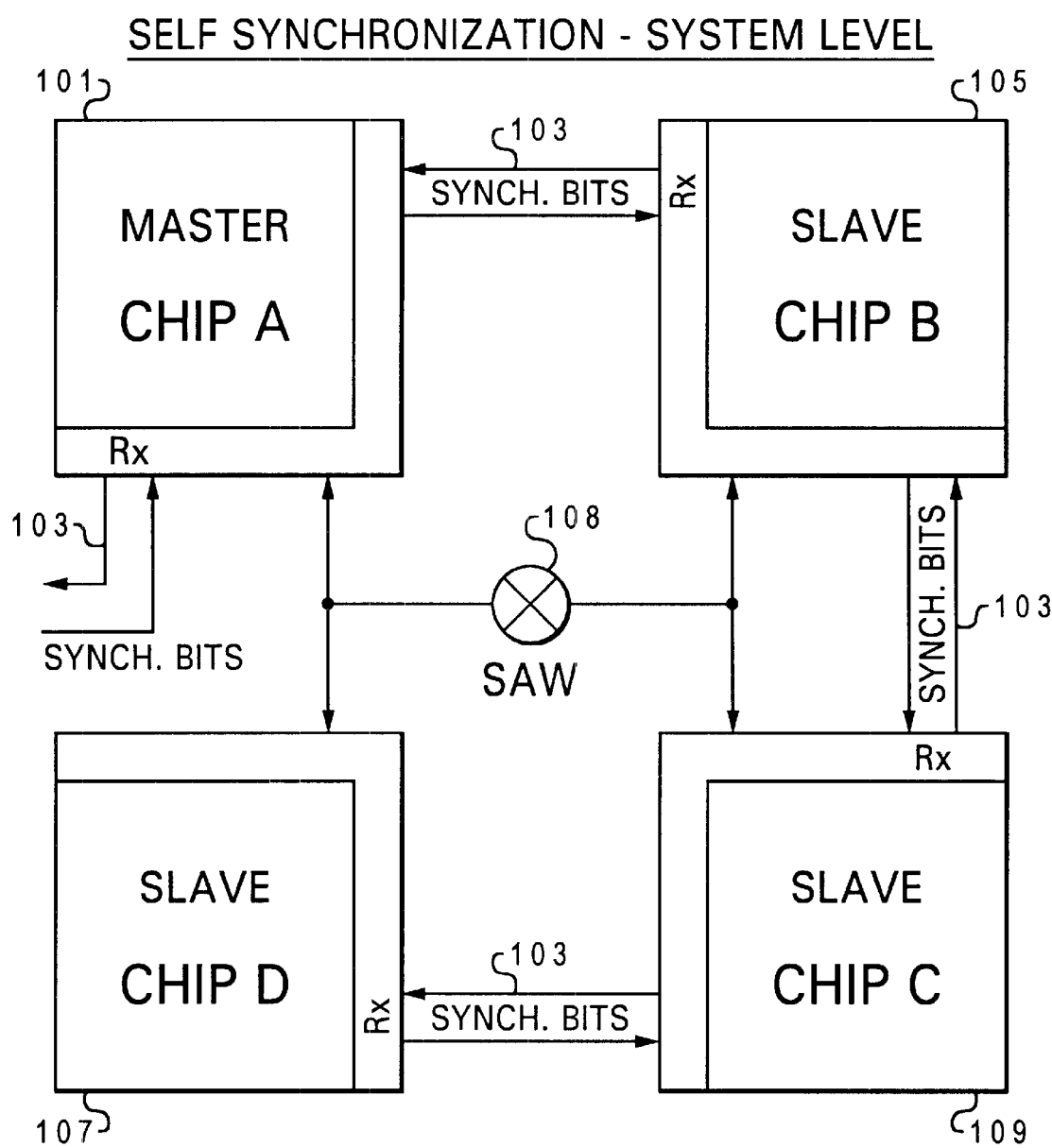
FIG. 1A is a block diagram of a four chip self-synchronization topology in accordance with a preferred embodiment of the present invention.
Figure 1B:
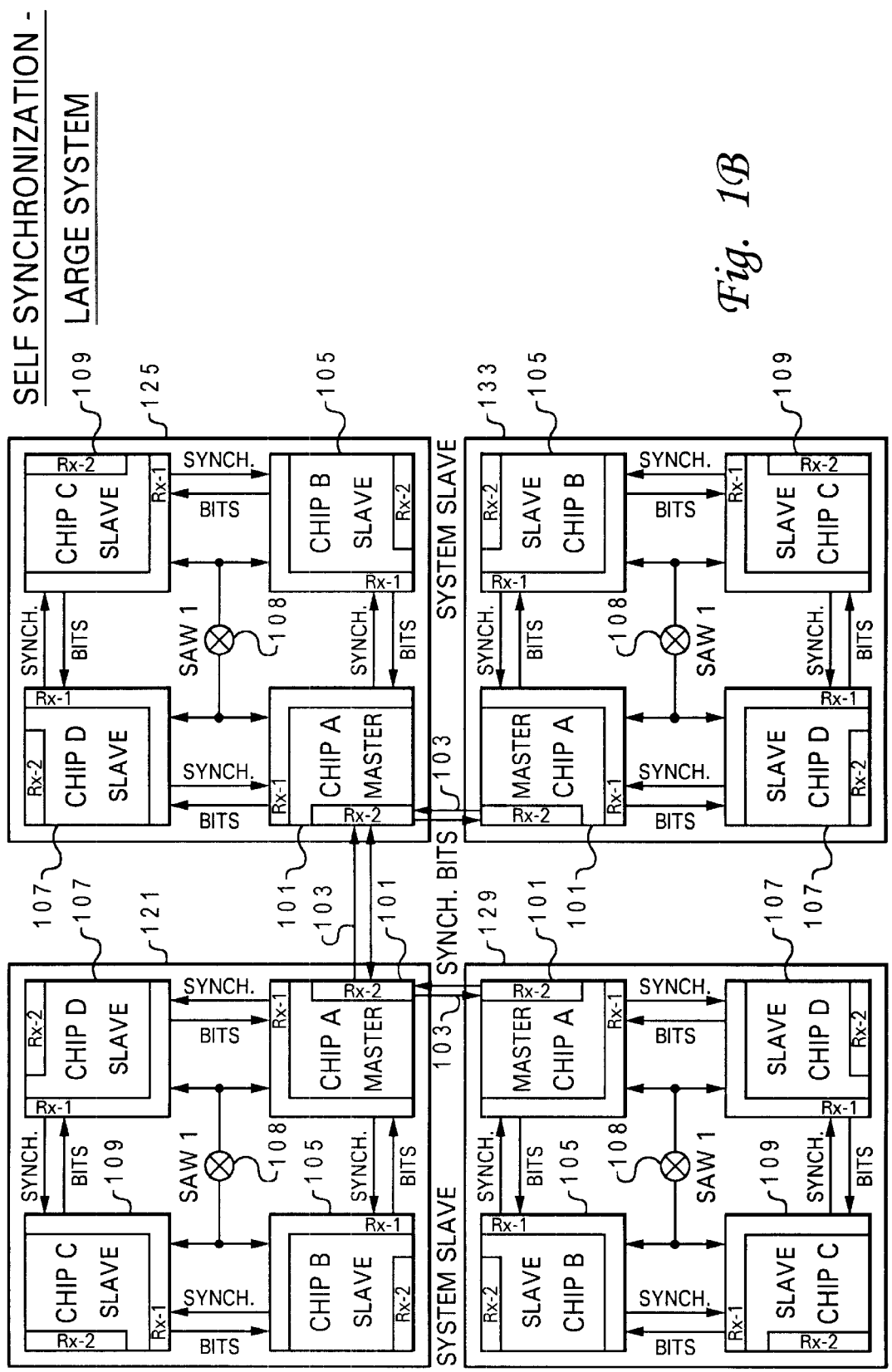
FIG. 1B is a block diagram of several interconnect self-synchronization chip topologies of FIG. 1A, in accordance with a preferred embodiment of the present invention.

This invention allows a self-synchronization of chips of a data processing system. FIG. 1A depicts a block diagram of the simplified topology of a group of components utilized within the invention. In the preferred embodiment, two types of chips exist, a master chip 101 coupled to a number of servant chips, specifically chip B 105, chip C 109 and chip D 107. Servant chip operates as a "slave" chip and both terms are used interchangably throughout. Master chip 101 is similar to servant chips but has been designated to be the control chip of the group. Each slave chip in the group is configured to share synchronization (sync) bits 103 with master chip 101 either directly or indirectly. Each group of chips in turn are connected to a high speed surface acoustic wave oscillator ("SAW") 108 sent to all the chips. As is shown, sync bits 103 also connect master chip 101 to other groups of chips as depicted in FIG. 1B. Notably in this embodiment each group 121, 125, 129, and 133 includes the four-chip topology of FIG. 1A. The groups are interconnected to each other via synch bits 103 of their respective master chip 101. In the preferred embodiment, synchronization of the master chips occurs first and then is propagated to the servant chips in each group.

A phase relation of clocks on different chips is a first unknown that affects synchronization of clocks among chips. A second unknown concerns a "round trip time" for transmissions between chips. At least in part due to the combination of these two unknowns, it is not obvious how to synchronize clocks on chips. In order to synchronize clocks among chips, it is not necessary to quantify both of these unknowns, it is merely necessary to know the combined effect of the two, and to adjust each chip's clock accordingly.

Figure 9:
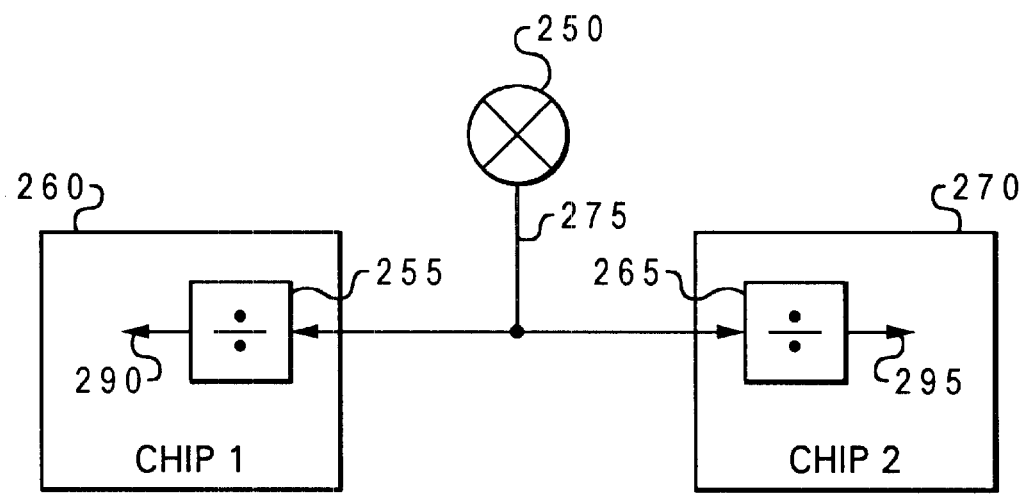
FIG. 9 depicts a SAW oscillator providing a reference clock signal to two chips according to one embodiment of the present invention.
Figure 10:
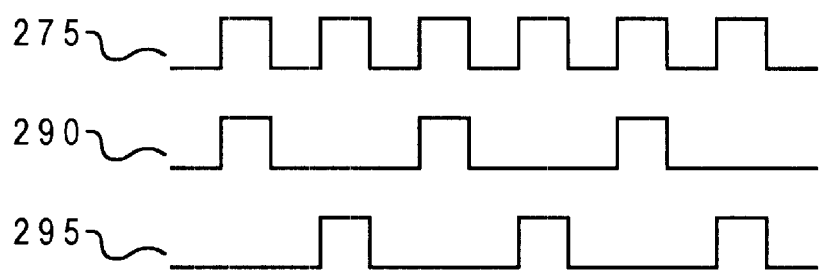
FIG. 10 depicts a phase difference of two local clocks from a reference clock according to one embodiment of the present invention.

The first unknown, i.e., the phase difference, is generally illustrated with reference to the block diagram of FIG. 9 and the clock signals of FIG. 10. The SAW oscillator 250 provides a reference clock signal 275 to chip 1,260 and chip 2,270. (Herein, a "chip" may also be referred to as a "core.") An instance of the reference clock signal 275 which has been divided down at a chip is referred to as the "local clock" for that chip. In FIG. 9, an instance of the reference clock signal 275 is divided down at chip 1 and is shown as local clock 290. Likewise, in FIG. 9, an instance of the reference clock signal 275 is also divided down at chip 2 and is shown as local clock 295.

Also shown in FIG. 9 is a divider 255 for chip 1 and a divider 265 for chip 2, for receiving and reducing the frequency of reference clock signals 275 respectively. In the illustrative example of FIGS. 9 and 10, the dividers 255 and 265 both divide by a factor of two. If the signals 290 and 295 output by the respective dividers 280 and 285 are not somehow synchronized, then despite being at the same frequency, i.e., one half the frequency of the reference clock 275, then reduced frequency clock signals 290 and 295 might be out of phase with each other, as shown in FIG. 10, depending on the time of initializing dividers 255 and 265.

Figure 3A:
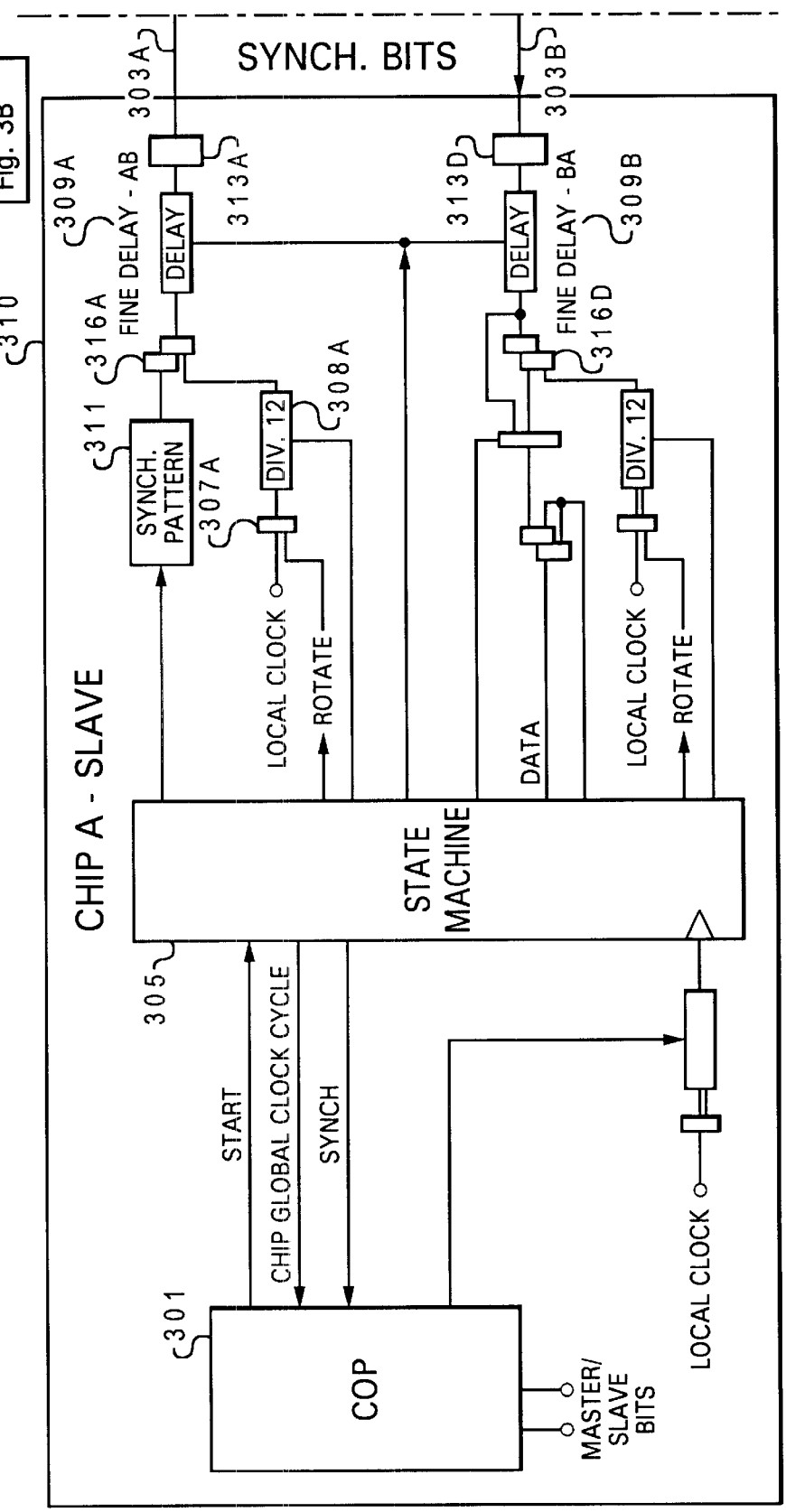
FIG. 3 is a block diagram depicting the internal hardware components of a self-synchronization system in accordance with a preferred embodiment of the present invention.
Figure 3B:
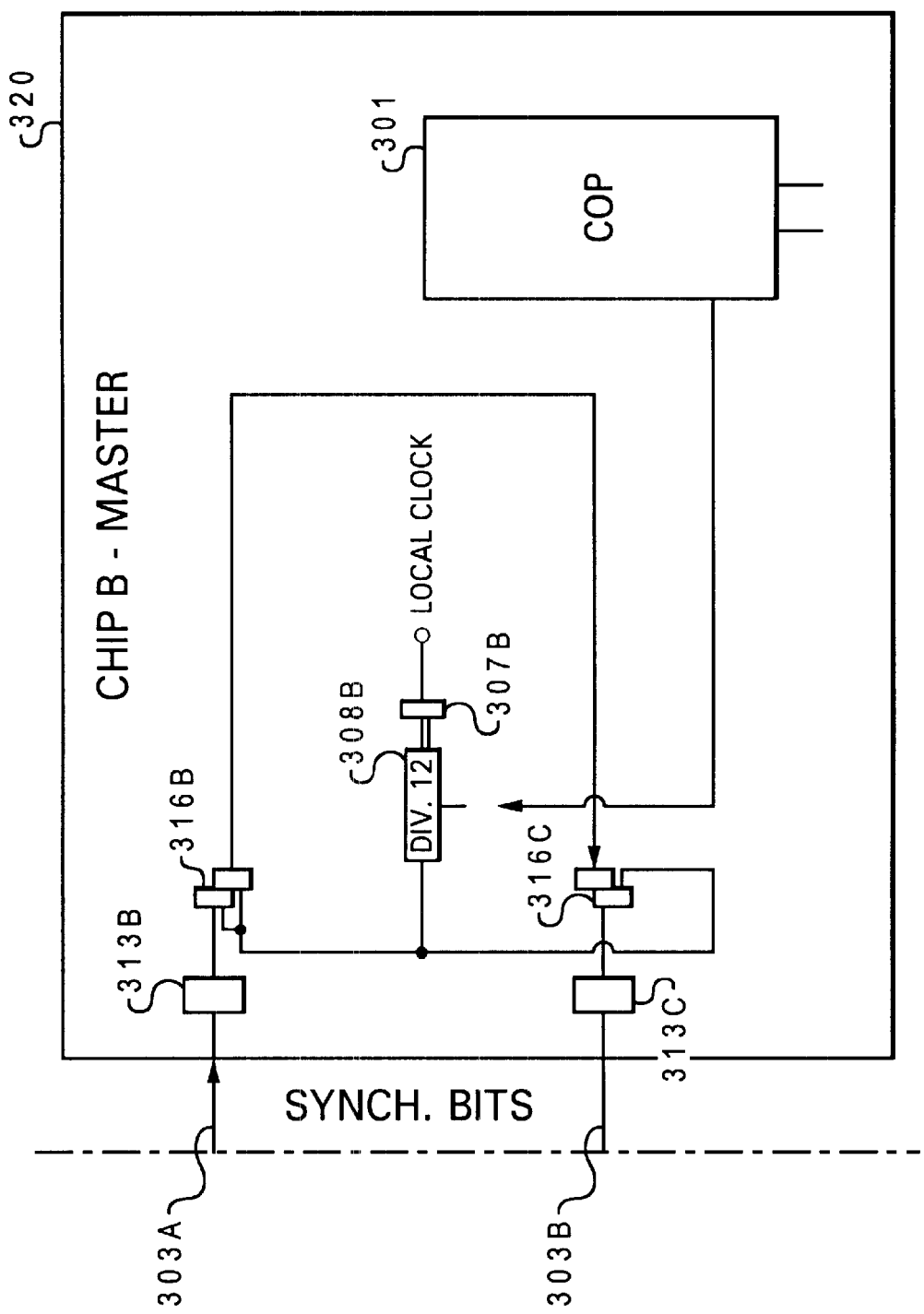

To understand the second unknown, i.e., the round trip time, some additional details regarding inter-chip communication, as shown in FIG. 3, must be understood.

Figure 2:
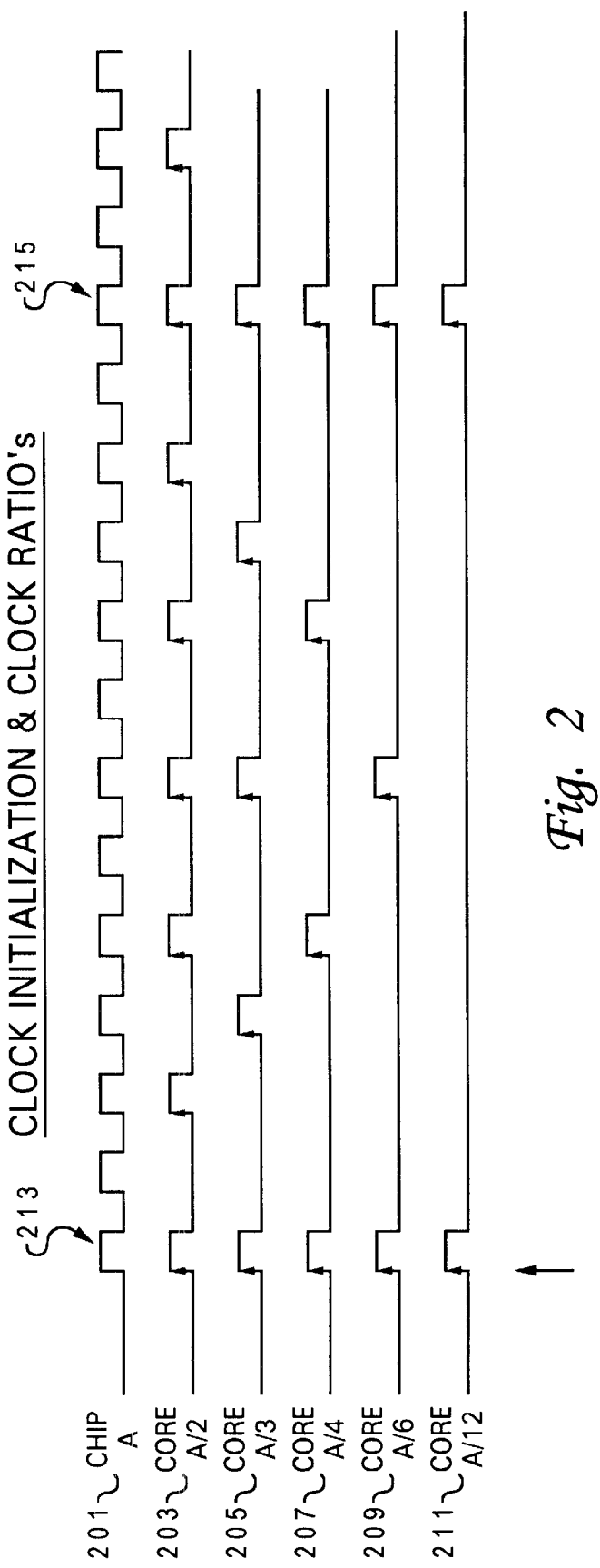
FIG. 2 is a timing diagram of a clock initialization/startup and bus clock ratios according to one embodiment of the present invention.

FIG. 2 depicts a simple clock sequence with a division-by-N factor. The "division-by" factors represent different clock initialization/startup points and bus clock ratios. Core A 201 represents the regular high speed clock sequence of chip A. Core A 201 may be divided by various integer value (N) to yield different clock sequences. In this illustration, core A/2 203, core A/3 205, core A/4 207, core A/6 209 and core A/12 211 are depicted. Note that the clock cycles get progressively slower as the divisor is increased. In this embodiment, when two clocks cycles are divided by twelve (12) and are in phase, inherently the divide by 2, 3, 4, and 6 are also in phase as depicted with clock phase 1 213 and clock phase 2 215. Thus, in the preferred embodiment, divide by twelve phase is utilized during clock synchronization. The clocks are synchronized when their respective divide by 12 clocks occur on exactly the same high speed clock cycle.

FIG. 3 is a block diagram of the self synchronization logic 310 for a slave chip (chip A), connected via synchronization bits 303A, and 303B to corresponding logic 320 for master chip (chip B). Both master logic 320 and slave logic 310 have clock startup and control logic 301 which is utilized to start the synchronization process. Slave logic 310 also has a local clock 307A which is an instance of reference clock (not shown) reduced in frequency by a factor of 12 by divider 308A at startup. Slave logic 310 generates a sync pattern 311 which is fed into a master/slave flip-flop (latch) 316A. Also connected to latch 316A is local clock 307A which is offset by a rotation cycle based on the state machine 305 initialization. Latch 316A is coupled to a fine delay element AB 309A which is in turn connected to off-chip driver/launch clock 313A. Synchronization includes a synchronization pulse being sent through the off-chip driver/launch clock 313A of logic 310 of slave chip A and received at on-chip receiver 313B before passing through latch 316B of logic 320 of master chip B. The synch pulse carries information about the synchronized pattern. After internal circulation and checking with the reference 307B clock of logic 320 of master chip B, which is also reduced in frequency by a factor of 12 by divider 308B, a sync pulse is sent out through latch 316A of master chip and off-chip driver/launch clock 313C. The pulse is received at on chip receiver 313D where it encounters fine delay elements BA 309B prior to being passed to latch 316D on servant chip 310. In this illustration, directional arrows indicate the path of the sync pulse.

A first pulse is sent by logic 310 of slave chip A and is received by logic 320 of master chip B. It is sent back to logic 310 by the logic 320, one cycle of logic's 320 local clock after receipt. Logic 310 sends a second pulse three cycles of logic's 310 local clock after the sending of the first pulse. The first and second pulse, separated by the three clock cycles, constitute a pattern of pulses. Further, logic 310 sends a third pulse three clock cycles after sending the second pulse, etc. The first, second, and third pulses separated by the three clock cycles, likewise constitute a pattern of pulses. The timing separation, i.e., three cycles, between pulses is merely to insure that the sending logic 310 is able to distinguish between the pulses when they are sent back to logic 310, and to enable detecting that a pulse arrived back at logic 310 on the incorrect bus cycle.

Propagation time for a pulse to travel from logic 310 to logic 320 is not known with certainty. Likewise, propagation time for a pulse to travel from logic 322 to logic 310 is not known with certainty. These propagation times are assumed to be the same. That is, it is assumed that the propagation time is the same in each direction. The sum of these two propagation times is hereinafter referred to as "the between chip propagation time." The sum of the between chip propagation time and the one cycle turnaround time provides a time hereinafter referred to as "the round trip time." The round trip time is the time it takes for a pulse to be launched, returned and then captured back by logic 310. Although it is assumed that the turnaround time is known with confidence, the between chip propagation time is not known with the same degree of certainty. So the round trip time is a second unknown.

Clocks on each chip are adjusted to compensate for the unknown phase relation and round trip time as follows. Logic 310 operates according to an assumed round trip time. Logic 310 tests are based on this round trip time interval, which according to the illustrative embodiment, is four clock cycles. Thus, logic 310 tests synchronization by sending, to a master chip, a pattern of two pulses, separated by three cycles, and capturing the pattern received back from the master chip four cycles later. If the pattern is received on the expected four cycles later, i.e., two pulses separated by three clock cycles, then logic 310 has confirmed that the clock on the slave chip is relatively closely synchronized with the clock on the master chip. If the pattern is not received four cycles later, then logic 310 adjusts its clock slightly and tests again. This clock adjusting, sending, capturing and comparing is repeated until substantial synchronization is achieved.

Further aspects of this are illustrated as follows. The pattern "10001" is sent by logic 310. Four cycles later a five cycle pattern is captured by logic 310. If the chips are synchronized, then the pattern 10001 is received by logic 310. However, if the chips are out of synchronization the pattern returns on a different cycle (or parts of a cycle) and the pattern captured on the fourth cycle will be different than the pattern sent) indicating that the slave and master are out of synchronization. For example, the pattern captured four cycles later may be "00010." In such a case, the three leading "0's" in the captured pattern indicate that the slave clock is possibly leading the master clock by about three cycles. Alternatively, the one trailing "0" in the captured pattern indicates that the slave possibly lags the master by about one cycle. (The pattern shown herein is utilized solely for illustrative purposes and is interchangeable with any other similar pattern.) The slave logic 310 adjusts its local divider by one reference cycle—shifting the divider phase and hence the local clock—in response to the indication by the captured pattern that there is a lack of sync between the slave and master. According to the preferred embodiment this adjustment includes adjusting which phases of its clock the slave logic 310 launches a pattern on.

Once the slave and master are substantially synchronized as indicated by the captured pattern being the same as the pattern sent, the slave fine tunes the synchronization by testing the timing margin. According to the preferred embodiment, this adjustment includes inserting a delay in the slave logic's clock relative to the master logic's clock. If a delay is inserted, it may be a relatively large delay, as generated by a course delay element, or it may be a relatively small delay, as generated by a fine element. (These delay elements and related matters are disclosed in the copending application set out in the beginning of the present application.)

Figure 8:
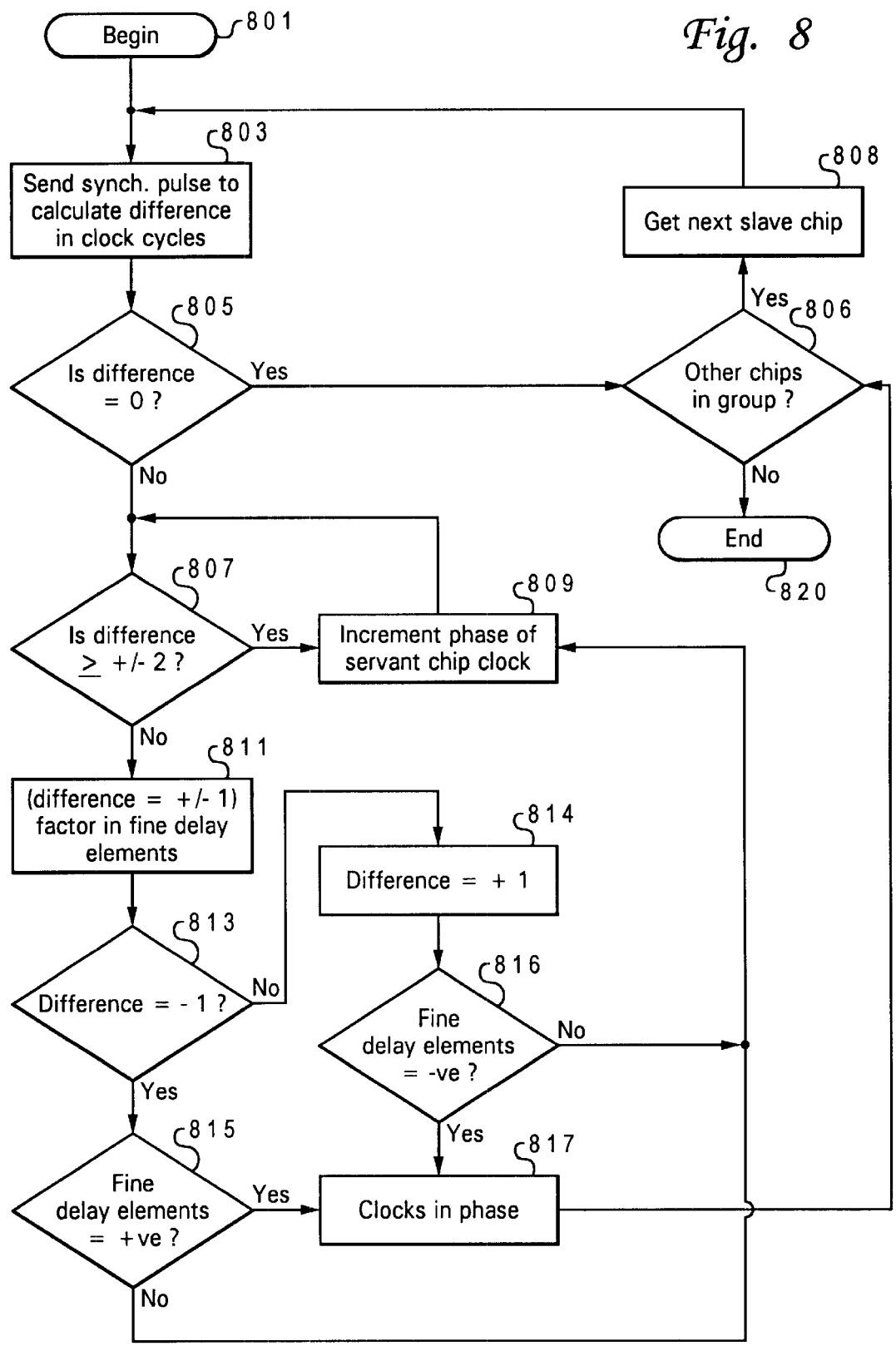
FIG. 8 is a flow chart of the process of self-synchronization according to a preferred embodiment of the present invention.

The above describe adjustments are made in accordance with the algorithm illustrated in the flowchart of FIG. 8.

According to the illustrative embodiment, shown in FIG. 9, one of the chips 260 and 270 serves as a master and the other chip as a slave. The slave chip queries the master (not shown) to determine whether the local clock signals 290 and 295 are in phase, i.e., synchronized. A timing diagram of the clock signals is shown in FIG. 10. For example, for master chip 260, if the signals 290 and 295 are not synchronized, the slave chip 270 adjusts its local clock signal 295 to be in phase with the master chip 260, local clock signal 290, which is of a reduced frequency. Once synchronized to the master chip 260, slave chip 270 serves as a master and synchronizes its clock 295 with another slave chip (not shown) that is not in direct communication with the master chip 260.

FIG. 4 depicts the sync pattern as it travels during the cycles of the reference clock of the CORE B/12 cycle 401. In this illustration, CORE B/12 401 is phased with servant clock CORE A/12. Four cycles are labelled cycle 0 415, cycle 1 416, cycle 2 417, and cycle 3 418. Cycle 0 415 represents the initialization (aka start-up) state. CORE A/12 state machine cycle 403 is synchronized with that of CORE A/12 resulting in a zero rotation cycle 405 (i.e., it is in phase with state machine). A synch pulse 407 is launched at the rising edge of cycle 0 415. It is captured on Chip B 409 at the rising edge of cycle 1 416. It takes one cycle to circulate on chip B 411 beginning on the rising edge of cycle 2 417. Then it is sent back to chip A where it is captured 413 on the rising edge of cycle 3 418. In this illustration, the entire synch pattern takes four complete cycles to travel from the slave chip to the master chip and back. The actual path travelled is illustrated in FIG. 3.

The present invention solves the problem of synchronizing two chips which are powered on and initialized individually. In this embodiment, the chips are shown in phase for simplicity. The mode bits define a master and a slave through control bits (see FIG. 3). Both chips enter sync/self sync mode. The slave initiates the sync pattern to the master. The master chip simply wraps the sync pattern back to the slave. The slave state machine is initialized with the rest of the chip. The state machine initially sets the clock for the synchronization bits in phase with the reference clock on the slave chip. This is denoted as "rotation-0" Launch (clock)-0, Capture (clock)-0 in FIG. 5.

Figure 5A:
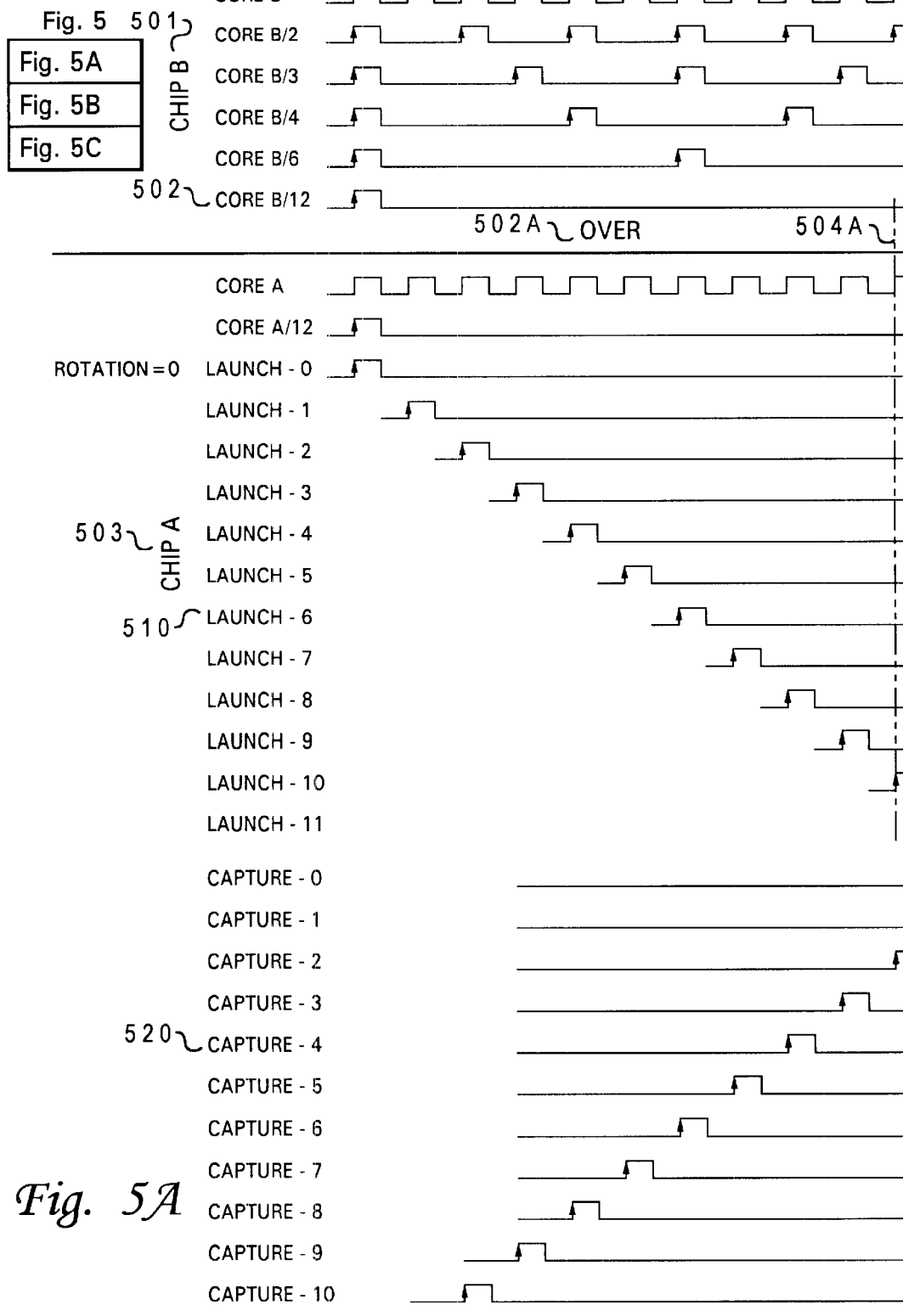
FIG. 5 is a timing diagram depicting possible launch clocks and capture clocks in timing margin calculation according to one embodiment of the present invention.
Figure 5B:
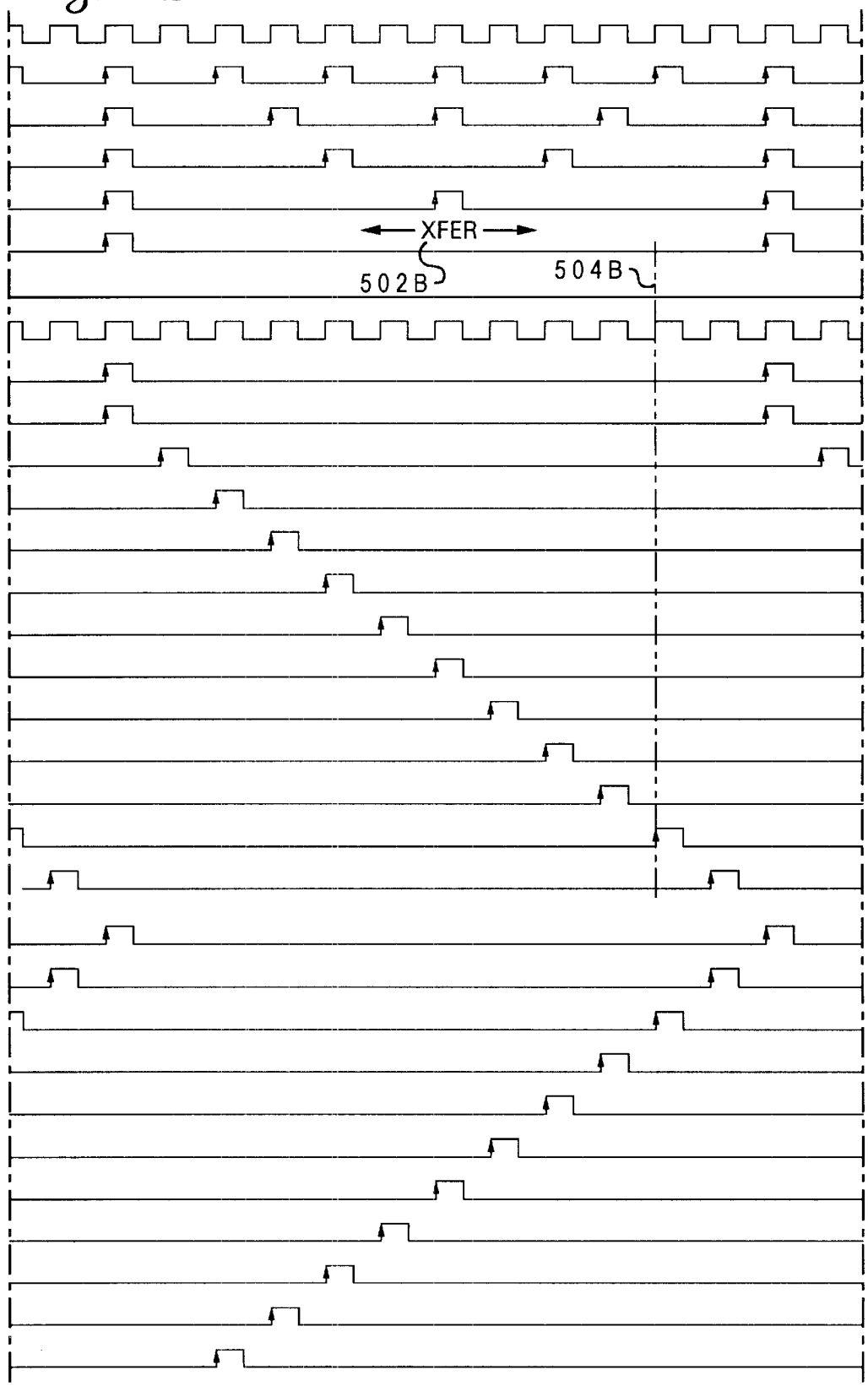
Figure 5C:
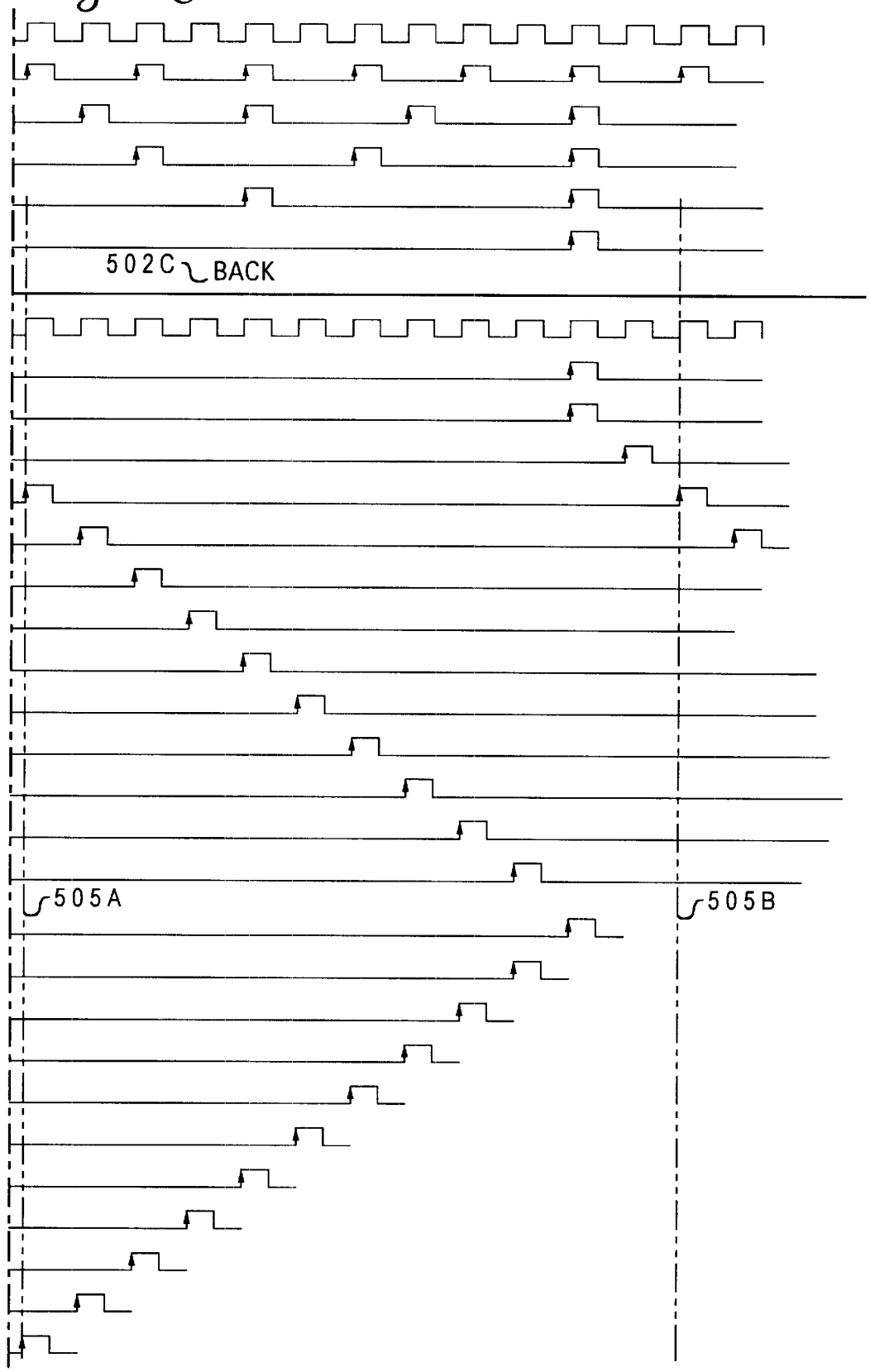

FIG. 5 is a timing diagram of the clocks on chip A and chip B. Chip B clock is identical to that of FIG. 2 and has been previously describe. It further illustrates the time period for a pulse to go "over" 502A from chip A to chip B, be transferred 502B within chip B and "back" 502C to the original chip. Chip A clock 503 has a series of launch 510 and capture 520 time lines representing the time periods between sending out synch bits and receiving sync bits.

FIG. 5 illustrates the process of checking for synchronization with a timing diagram. In this embodiment, Chip B 501 represents the master chip which has a divide-by-12 clock cycle 502. The three cycles depicted are "over" 502A, "transfer" 502B and "back" 502C. These in turn represent travel cycles for the synch pulse. Both the launch and capture clocks, as illustrated in FIG. 3 are set to divide-by-12 to allow for synchronization. Chip A clock 503 is depicted with various launch points when rotation equals zero. Namely launch points 0 (representing equal launch point with master clock) to launch point 11 are shown. Each launch point corresponds to 1 of the 12 ticks of a high speed clock during a divide by 12 clock phase. Chip A may be initiated/started at any one of these points during operation. The initiation point is arbitrary and the invention seeks to synchronize this arbitrary point to the clock phase of chip B 501. Several vertical lines are drawn on the clock phase of chip A 503. The first two lines 504A and 504B are utilized during the forward path while the next two lines 505A and 505B are utilized during the return path of the sync pulse. The vertical lines are arbitrary points in time which represent the latency between chips. The time between the vertical line and the clock edge represents the transfer time between chips. If a chip is launched left of the first vertical line, then it is captured on the next clock pulse of chip B. When chip A is initiated prior to line 504A, then the chip pattern falls within chip B 501 patterns and takes the pre-determined clock cycles to complete the loop. When chip A is initiated after line 504A, then it is one pulse off and takes an additional clock cycle to return. A short delay time is intrinsic in the chip's sync pulse launch, which results in the vertical line 504A being several high speed cycles before the divide by 12 cycle. As can be seen in this embodiment, all launch periods 0 through 10 are valid (i.e., data returns on a proper cycle). Launch periods 10 and 11 are out of phase (i.e., require a full phase adjustment). During the return path, (i.e., the capture path) also with rotation =0, vertical line 505A has line 504A of the forward path. In this case, the first 10 capture paths (capture 0 through 9) are good while the last two are not.

Once the correct sync pulse is received, the state machine "stresses" the path between chips to determine the timing margin or slack which exists in the path from chip A 503 to chip B 501. The state machine next determines the amount of timing margin in the path from chip B 501 to chip A 503. The paths between chip A and chip B are designed to be essentially equal in delay in both directions. Therefore, the difference in timing margin for the two paths should be nearly zero when the two chips are in phase. If the two reference clocks are in phase, then shifting the reference clock on chip A 503 by some fixed amount causes the path in one direction to chip B 501 to increase by the fixed amount and the return path to decrease by the same fixed amount. If the path over and back is measured in both directions, then the difference is two times the fixed amount of delay. As noted above, the phase of the local reference clock, which is in phase with the reference clock on the other chip, has a n early zero difference in timing margin for the two paths between chips. If the phase of the reference clock of a slave chip is shifted by one high speed clock cycle, then a difference of 2× (high clock cycles) of difference in timing margins will be calculate d by the state machine. All possible phases of the divide-down clock are searched and the divided-down clock phase whose phase is closest (within one high speed clock cycle) to the master chip is determined.

Returning now to FIG. 5, the data is launched out of chip A 503. If the chips are in phase, the sync pattern returns on the third cycle. If they are not in phase, then the pattern returns on the fourth cycle. This means that the divide-by-12 is off and the next clock phase is tested. In this illustration, this occurs for rotation 10 and 11. Each launch in the forward direction is tested by freezing the launch side of the trip and stressing the cycles. In this illustration, the freeze occurs with rotation=2. The capture side rotation=1. Each vertical line represents 2 cycles of latency. There are 8 cycles of margin plus 2 cycles to get over which yields 10 cycles in the forward direction. In the return direction, twelve cycles of margin plus the 2 cycles to get back are utilized to yield 14 cycles. When the absolute value of the difference of the cycles forward and backward are calculated it yields a difference of 4 (14−10). When the clocks are in phase, this result would be zero as the return and forward phases cycles would be equal. Thus, every round trip not in phase has a doubling effect of decreasing in one direction while increasing in the other direction.

In this illustration, all the possible phases are tested until the chips are adjusted and in phase. In the capture phase, this is completed by freezing the return path, (the back path of 14 cycles) and stressing the over path with launch rotation= 3. At rotation=10, the pattern breaks.

In order to get resolution below one clock cycle, the path is then stressed in terms of a fraction of a high speed clock cycle with fine delay elements i.e. ¹⁄₁₀ a high speed clock (see FIG. 3, fine delay elements AB & BA). Next, the margin in the return path is measured while holding the launch clock at its initial setting for this rotation (Launch-0). The slacks in each path are then subtracted from each other, cycle from cycle and fine delay element from fine delay elements.

Figure 7A:
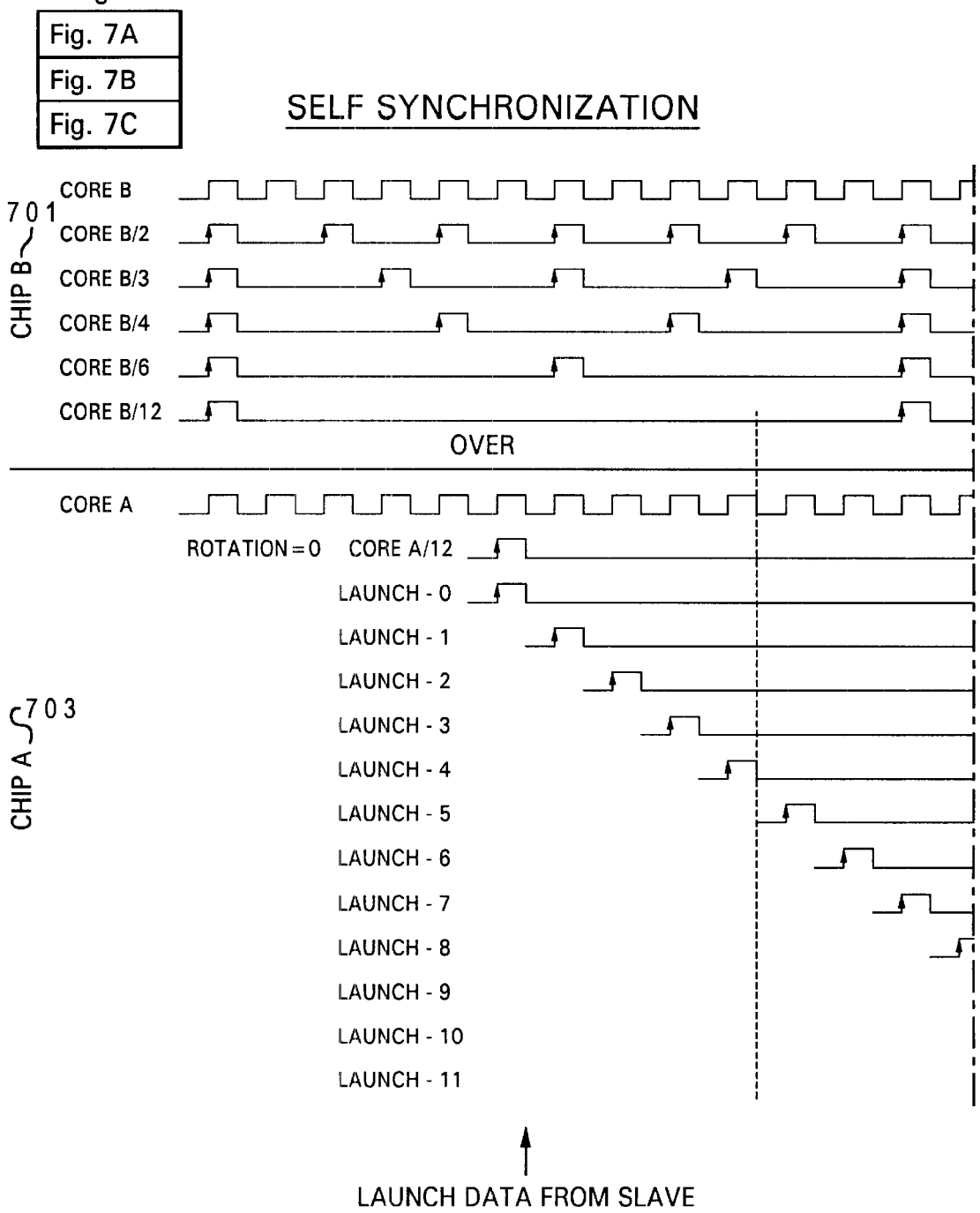
FIG. 7 is a timing diagram of a clock initializing out of phase according to one embodiment of the present invention.
Figure 7B:
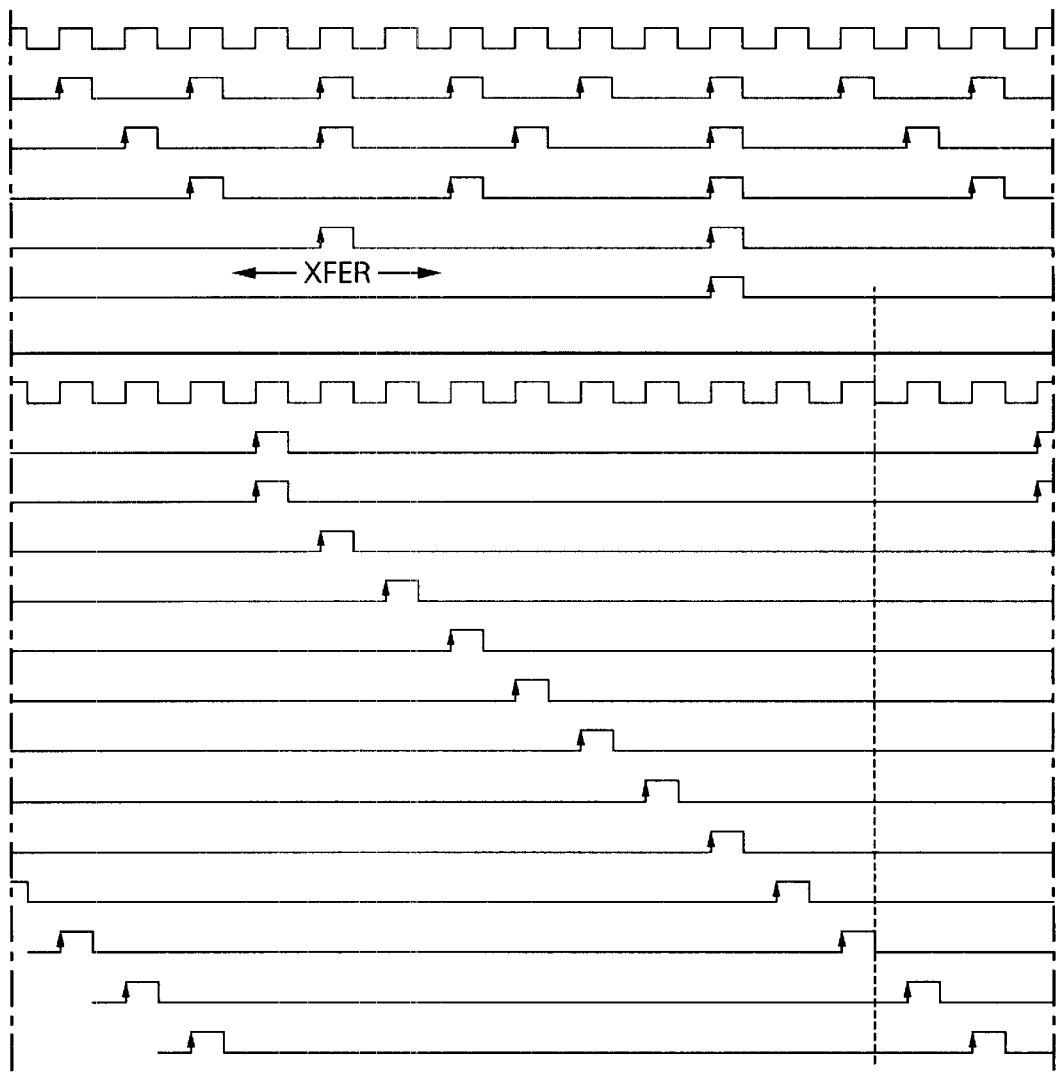
Figure 7C:
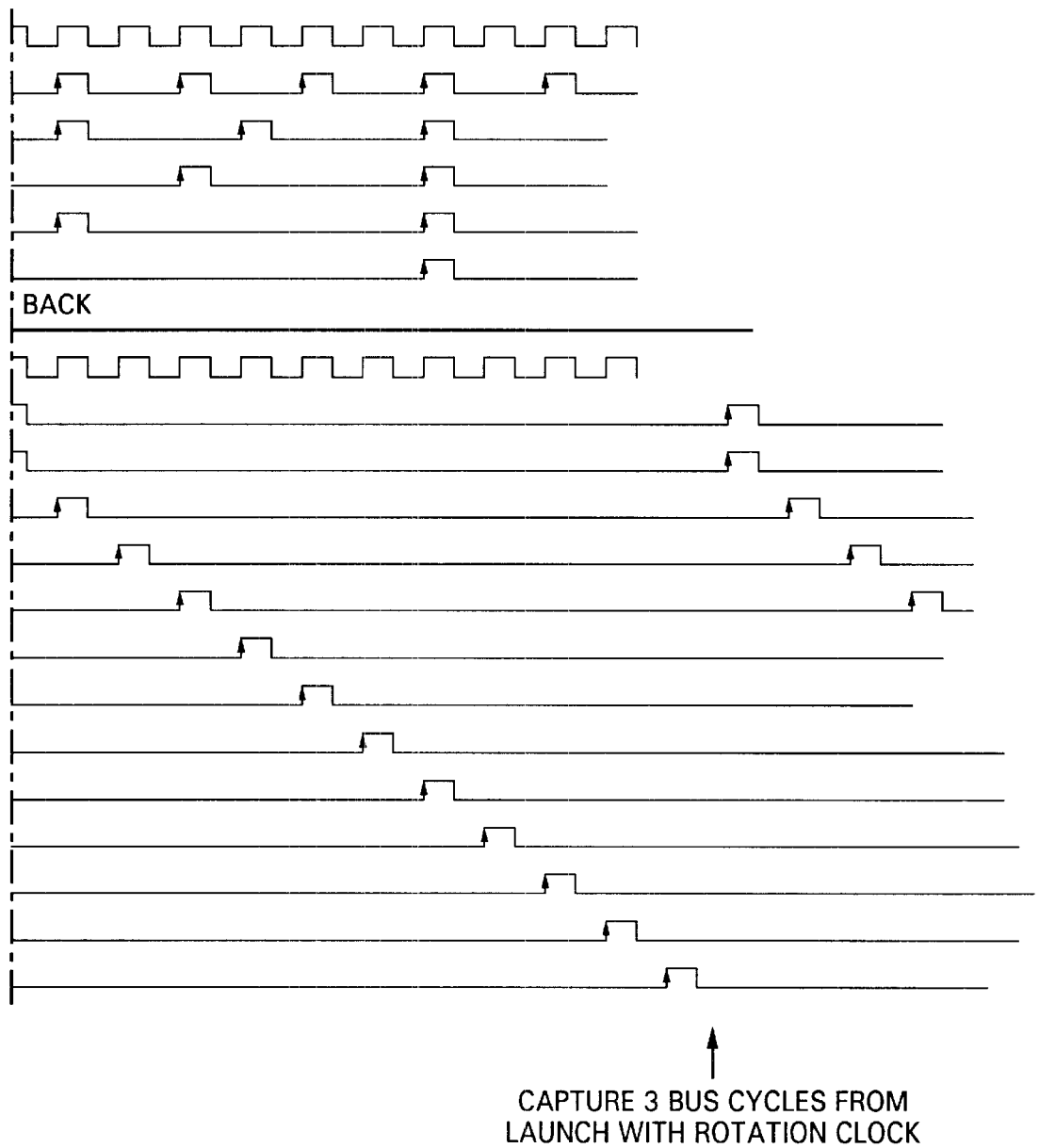

FIG. 7 shows master chip clock 701 and servant chip clock 703 initialized to another arbitrary reference clock phase. Like FIG. 5, the rotation is kept at zero (0) while the launch phase is changed with a different beginning launch phase location. In this illustration, launch=4 is the last phase which results in the over path completing in 3 cycles. This illustrative embodiment yields a correct beginning phase of launch=7.

An algorithm is now presented. According to one embodiment, the following assumptions are made to make the algorithm realizable:

1. The reference clock cycle in which the synchronization pattern arrives back to the sending chip is known. In the preferred embodiment, the round trip delay from chip A to chip B and back is three reference clocks, (i.e. less than one cycle to transfer the sync pattern from input to output on chip B and less than one cycle to return the sync pattern to chip A again). Also, a fourth cycle is added to transfer data to the state machine; and 2. Two times the skew on the high speed clocks between chip A and chip B plus the difference in path delays between chip A to chip B is less than one high speed clock cycle. Note, the ideal objective is to phase synchronize the two chips to the same high speed cycle on all chips in the system.

Chip A (slave) enters sync mode and sends the synchronization pattern to chip B (master). The sync pattern is defined here to be 100010001000. The interface operates at 12:1 (reference cycle) relative to the internal chip speeds of chip A and B. In this embodiment, it is assumed to take less than one reference cycle to propagate across the interface. Upon receiving the synchronization pattern, chip B sends the pattern back to chip A. It is also assumed that it takes one bus cycle on chip B to turn the data around and be ready to transmit the sync pattern back to chip A and that it takes less than one reference cycle for the sync pattern to propagate from chip B to chip A.

Figure 6A:
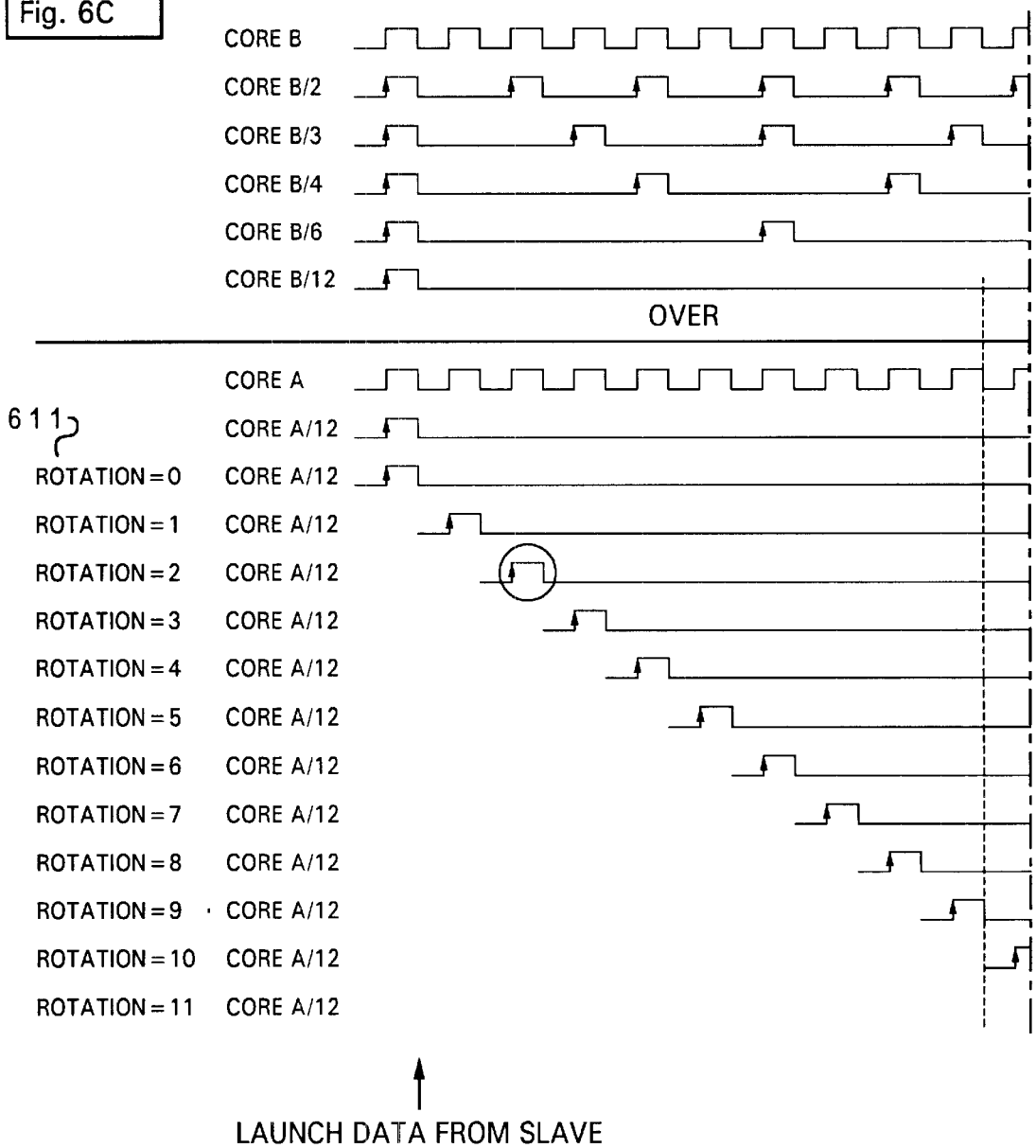
FIG. 6 is a timing diagram of launch data from a slave chip with associated rotations according to one embodiment of the present invention.
Figure 6B:
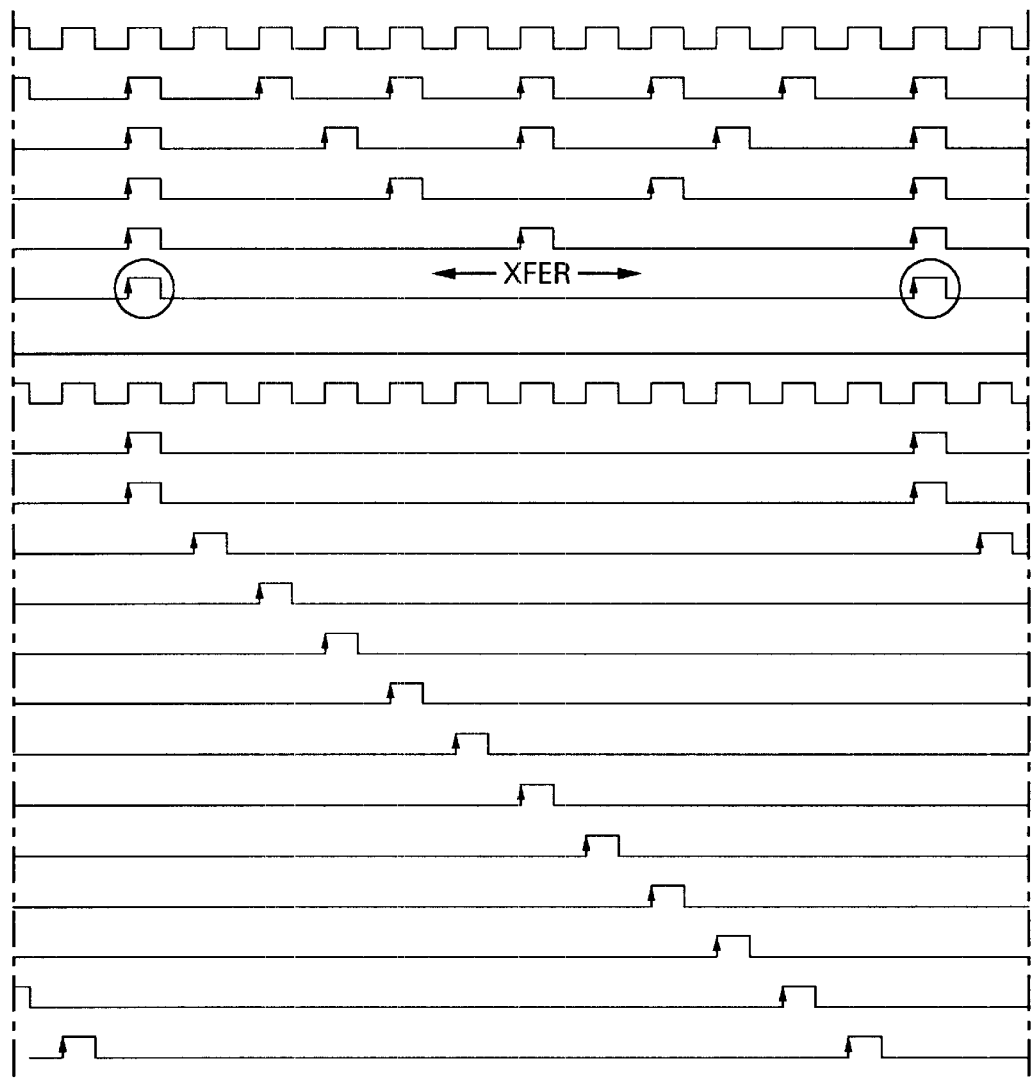
Figure 6C:
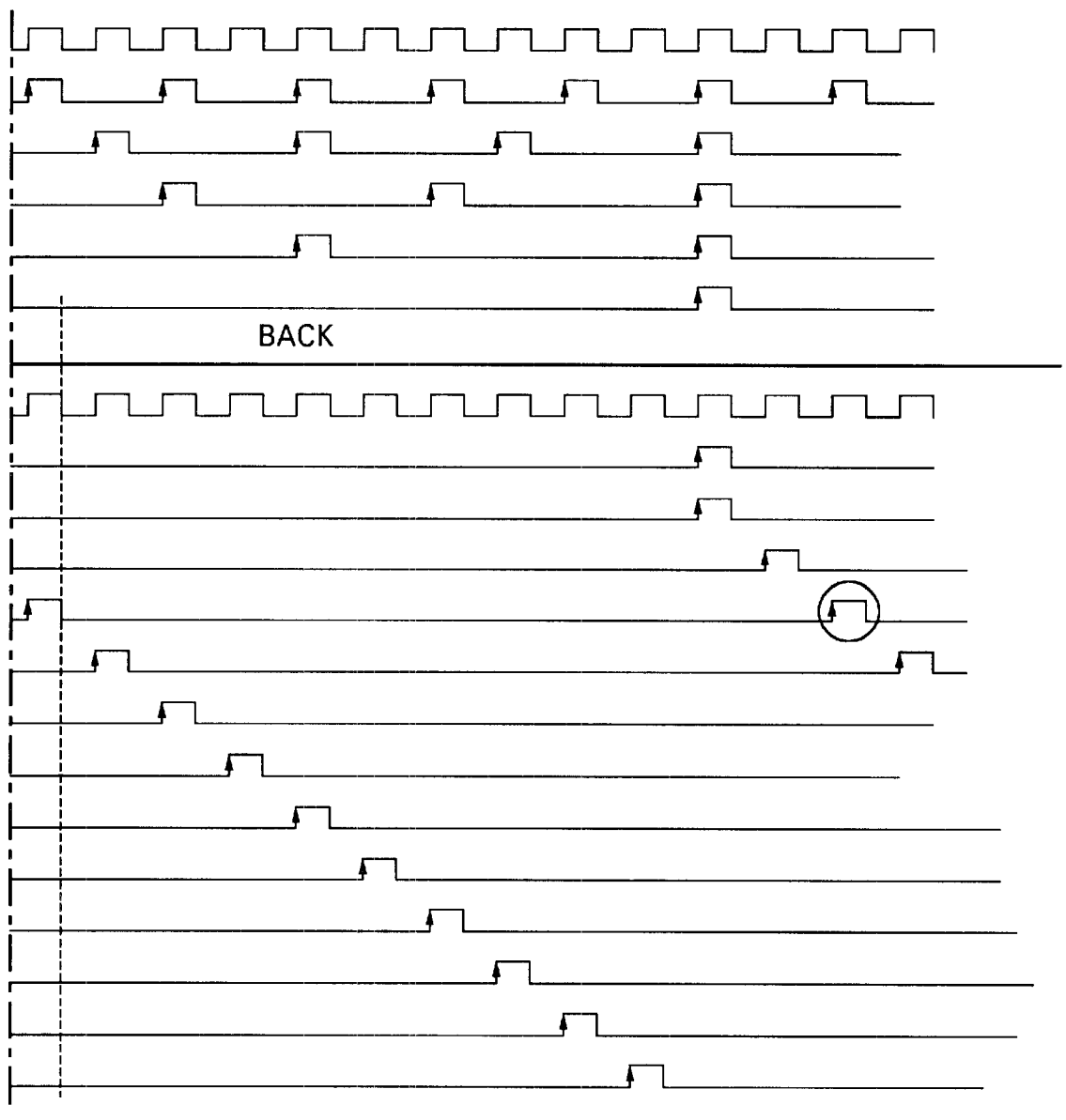

Returning now to the figures, FIG. 6 illustrates possible reference clock "rotations"(0–11). Once again CORE B/12 represents the reference clock or master chip clock. CORE A/12 clock (or servant chip clock) is depicted with 12 rotational stages (0–11) 611. Each rotation represents a high speed clock cycle. FIG. 6 operates on the same basic premise of FIG. 5, with the exception being that the phase rotations are being changed and not the launch or capture rotations. These phase rotations represent incremental value changes from the reference clock. When the clocks are perfectly in phase (i.e. rotation=0) then all cycles=12. When not in phase, then cycles are lost during the forward stage and gained during the return stage. In this illustration, with rotation=two (2) for example, the number of high speed clock cycles during the over path before the first divide-by-12 cycle is 10, while the number of cycles during the return phase is 14. Those skilled in the art comprehend the cycle differences which exist, as illustrated by the timing diagrams.

In this embodiment, the slave's state machine tests the round trip path by sending the sync pattern to the master chip and utilizes the following algorithm to find the closest reference clock within one high speed cycle to the reference clock on the master chip:

1. If the latency in the round trip does not equal the predetermined number of reference clock cycles (defined here as four) it is not in phase with the master reference clock, hence increment the phase of the reference clock by one rotation, (i.e. rotation=n+1).
2. If the latency does equal four reference clock cycles, then determine the number of high speed clock cycles of slack or timing margin in the path from the slave to the master. This is accomplished by stretching the phase of the launch clock by one high speed cycle at a time (as depicted in FIG. 5, launch clock-1,2,3,4,etc.) and retesting the path.

Turning now to FIG. 8, there is depicted a flow chart of the synchronizing algorithm. Once the process begins (step 801) a determination is made as to differences in the cycles of the individual chips (step 803). The process then checks to see if the difference in cycles is zero (step 805). If it is zero, the chips are synchronized and the process checks for additional chips to be synchronized (step 806). If there are other chips in the group, the next slave chip is compared (step 808) with the present slave chip and the process begins again. If, however, no other chips remain, the process ends (step 820). Note that in the preferred embodiment, the process continues until all the chips have been synchronized. When there is a difference in the cycles, a check is made to determine if the magnitude of the difference in cycles is greater than or equal to +/−2 (step 807). If the difference in cycles is greater than or equal to +/−2, the process increments the phase of the servant clock (step 809). When the difference is less than 2 (either + or −1), the fine delay elements are factored in (step 811). A series of decision-process steps are made based on the value of the difference and that of the fine delay elements. First, a determination is made whether or not the difference is −1 (step 813). When the difference is −1 and the difference in fine delay elements is positive (step 815) then the servant chip clock is in phase with the reference clock of the master chip (step 817) and the process checks for additional chips in the group (step 806). Also, when the difference is +1 (step 814) and the difference in fine delay elements is negative (step 816) then the servant chip clock is in phase with the reference clock on the master chip (step 817). If the difference is +1 and the difference in fine delay elements is positive or if the difference is −1 and the difference in fine delay elements is negative, then the phase of the servant chip clock is incremented (step 809).

While the invention has been particularly shown and described with reference to a preferred embodiment, it will be understood by those skilled in the art that various changes in form and detail may be made therein without departing from the spirit and scope of the invention. For example, although the invention has been described with reference to three clock cycles to complete the round trip. it is understood by those skilled in the art that any number of clock cycles may be required to complete the round trip depending on various factors including the topology and speed, etc. of the hardware components.

What is claimed is:

1. A method for dynamic synchronization of data processing system processor chips, said method comprising the steps of:
    launching a pulse from a secondary chip to a primary chip, said chips being coupled together via a plurality of links;
    evaluating a clock pattern related to said pulse with a reference clock pattern of said primary chip; and
    synchronizing a clock phase of said secondary chip to said clock phase of said primary chip based on a result of said comparing step;
    wherein said evaluating comprises:
        transmitting a synchronization pattern between said secondary chip and said primary chip, wherein said pattern is first transmitted to said primary chip from said secondary chip, then re-transmitted to said secondary chip;
        logging a number of clock cycles required for said pattern to return to said secondary chip;
        comparing said number of clock cycles to a predetermined value to yield a result; and
        adjusting said local clock of said secondary chip based on said result.

2. The method of claim 1, wherein said synchronizing step further includes the step of synchronizing another secondary chip with said secondary chip substituted as said primary chip.

3. The method of claim 1, wherein said logging step is completed by a state machine of said secondary chip, said state machine comprising of program code to implement said synchronization of said secondary chip.

4. The method of claim 1, wherein said comparing step further comprises the step of comparing said value to three (3) divide-by-12 reference clock cycles, with a fourth cycle added for transferring said pattern to said state machine.

5. The method of claim 1, wherein said adjusting step includes the steps of:
    analyzing said pattern to determine if it is the same synchronization pattern originally sent by said state machine; and
    stressing a path between chips to determine the timing margin which exists in said path, said timing margin being the difference of a number of high speed clock cycles during sending and receiving of said pattern, wherein when said chips are synchronized, said timing margin is equal to zero (0).

6. The method of claim 1, said adjusting step further comprising the steps of:
    testing a round trip path utilizing an algorithm within said state machine to find a closest reference clock within one high speed cycle to said reference clock on said primary chip;
    incrementing a phase of said local clock of said secondary chip by a rotation when a latency in said round trip does not equal a predetermined number of reference clock cycles;
    determining a number of high speed clock cycles of timing margin in said path from said secondary chip to said primary chip when said latency equals said predetermined value;

stressing said phase of the launch clock by one high speed cycle at a time; and retesting said path for said timing margin.

7. The method of claim 6, wherein said clock is utilized as a capture clock and a launch clock for receiving and sending said pattern respectively and wherein said stressing step includes the steps of:

holding a phase of said capture clock while changing said phase of said launch clock until said path no longer provides a correct number of reference clock cycles in said round trip;

setting said phase of said launch clock to a last passing launch clock phase in whole high speed cycles as a new reference point; and stressing said path in fractions of said high speed cycle with predetermined finite delay element.

8. The method of claim 7, wherein said predetermined finite delay element of said stressing step is $\frac{1}{10}$ a high speed clock cycle.

9. The method of claim 7, wherein said stressing step includes the steps of:

measuring a margin in a return path, while holding said launch clock at its initial setting for a set rotation; and subtracting slacks in each path of one cycle from another cycle.

10. The method of claim 9, wherein said subtracting step further includes the steps of determining synchronization based on an algorithm, said algorithm including:

1) If the difference in cycles is zero, said synchronization is complete;
2) If the difference in cycles is equal to or greater the +/−2, said phase of said reference clock is incremented;
3) If the difference is +/−1, said fine delay elements are factor in;
4) If the difference is −1 and the difference in fine delay elements is positive then the reference clock is in phase with the master chip and said chips are synchronized;
5) If the difference is +1 and the difference in fine delay elements is negative then the reference clock is in phase with the master chip and said chips are synchronized; and
6) If the difference is +1 and the difference in fine delay elements is positive or if the difference is −1 and the difference in fine delay elements is negative, then said phase of said reference clock is incremented and the path is re-tested.

11. A system for dynamic synchronization of data processing system processor chips, said system comprising:

means for launching a pulse from a secondary chip to a primary chip, said chips being coupled together via a plurality of links;

means for analyzing a clock pattern related to said pulse with a reference clock pattern of said primary chip; and means for synchronizing a clock phase of said secondary chip to said clock phase of said primary chip based on a result of said comparing step;

wherein said analyzing means comprises:

means for transmitting a synchronization pattern between said secondary chip and said primary chip, wherein said pattern is first transmitted to said primary chip from said secondary chip, then re-transmitted to said secondary chip;

means for logging a number of clock cycles required for said pattern to return to said secondary chip;

means for comparing said number of clock cycles to a predetermined value to yield a result; and means for adjusting said local clock of said secondary chip based on said result.

12. The system of claim 11, wherein said synchronizing means further includes means for synchronizing another secondary chip with said secondary chip substituted as said primary chip.

13. The system of claim 11, wherein said logging means is completed by a state machine of said secondary chip, said state machine comprising of program algorithm to implement said synchronization of said secondary chip.

14. The system of claim 11, wherein said comparing means further comprises means for comparing said value to three (3) divide-by-12 reference clock cycles, with a fourth cycle added for transferring said pattern to said state machine.

15. The system of claim 11, wherein said adjusting means includes:

means for analyzing said pattern to determine if it is the same synchronization pattern originally sent by said state machine; and means for stressing a path between chips to determine the timing margin which exists in said path, said timing margin being the difference of a number of high speed clock cycles during sending and receiving of said pattern, wherein when said chips are synchronized, said timing margin is equal to zero (0).

16. The system of claim 11, said adjusting means further comprising:

means for testing a round trip path utilizing an algorithm within said state machine to find a closest reference clock within one high speed cycle to said reference clock on said primary chip;

means for incrementing a phase of said local clock of said secondary chip by a rotation when a latency in said round trip does not equal a predetermined number of reference clock cycles;

means for determining a number of high speed clock cycles of timing margin in said path from said secondary chip to said primary chip when said latency equals said predetermined value;

means for stressing said phase of the launch clock by one high speed cycle at a time; and means for retesting said path for said timing margin.

17. The system of claim 16, wherein said clock is utilized as a capture clock and a launch clock for receiving and sending said pattern respectively and wherein said stressing means includes:

means for holding a phase of said capture clock while changing said phase of said launch clock until said path no longer provides a correct number of reference clock cycles in said round trip;

means for setting said phase of said launch clock to a last passing launch clock phase in whole high speed cycles as a new reference point; and means for stressing said path in fractions of said high speed cycle with predetermined finite delay element.

18. The system of claim 17, wherein said predetermined finite delay element of said stressing means is $\frac{1}{10}$ a high speed clock cycle.

19. The system of claim 17, wherein said stressing means includes:

means for measuring a margin in a return path, while holding said launch clock at its initial setting for a set rotation; and means for subtracting slacks in each path of one cycle from another cycle.

20. The system of claim 19, wherein said subtracting means further includes means for determining synchronization based on an algorithm, said algorithm including:

1) If the difference in cycles is zero, said synchronization is complete;
2) If the difference in cycles is equal to or greater the +/−2, said phase of said reference clock is incremented;
3) If the difference is +/−1, said fine delay elements are factor in;
4) If the difference is+1 and the difference in fine delay elements is positive then the reference clock is in phase with the master chip and said chips are synchronized;
5) If the difference is +1 and the difference in fine delay elements is negative then the reference clock is in phase with the master chip and said chips are synchronized; and
6) If the difference is +1 and the difference in fine delay elements is positive or if the difference is −1 and the difference in fine delay elements is negative, then said phase of said reference clock is incremented and the path is retested.

* * * * *